US009065268B2

(12) United States Patent
Mori et al.

(10) Patent No.: US 9,065,268 B2
(45) Date of Patent: Jun. 23, 2015

(54) INRUSH-CURRENT SUPPRESSING DEVICE AND INRUSH-CURRENT SUPPRESSING METHOD

(75) Inventors: Tomohito Mori, Tokyo (JP); Haruhiko Koyama, Tokyo (JP); Aya Yamamoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 518 days.

(21) Appl. No.: 13/576,513

(22) PCT Filed: Apr. 8, 2010

(86) PCT No.: PCT/JP2010/056398
§ 371 (c)(1),
(2), (4) Date: Aug. 1, 2012

(87) PCT Pub. No.: WO2011/125210
PCT Pub. Date: Oct. 13, 2011

(65) Prior Publication Data
US 2012/0293896 A1    Nov. 22, 2012

(51) Int. Cl.
*H02H 9/00* (2006.01)
*H02H 9/02* (2006.01)
*H02H 7/04* (2006.01)

(52) U.S. Cl.
CPC . *H02H 9/002* (2013.01); *H02H 7/04* (2013.01)

(58) Field of Classification Search
USPC .......................................... 307/101
See application file for complete search history.

(56) References Cited

U.S. PATENT DOCUMENTS

| 2004/0124814 A1 | 7/2004 | Tsutada et al. |
| 2008/0164962 A1 | 7/2008 | Koyama et al. |

(Continued)

FOREIGN PATENT DOCUMENTS

| JP | 2004-208394 A | 7/2004 |
| JP | 3804606 B2 | 8/2006 |

(Continued)

OTHER PUBLICATIONS

International Search Report (PCT/ISA/210) issued on Jul. 13, 2010, by the Japanese Patent Office as the International Searching Authority for International Application No. PCT/JP2010/056398.
Written Opinion (PCT/ISA/237) issued on Jul. 13, 2010, by the Japanese Patent Office as the International Searching Authority for International Application No. PCT/JP2010/056398.

*Primary Examiner* — Robert Deberandinis
(74) *Attorney, Agent, or Firm* — Buchanan Ingersoll & Rooney PC

(57) ABSTRACT

An inrush-current suppressing device includes a residual-magnetic-flux calculation unit that obtains a residual magnetic flux generated within a three-phase transformer, an input magnetic-flux-error calculation unit that obtains a closing-phase input magnetic-flux error, a closing-order determination unit that determines a closing order of phases of a three-phase breaker, a target-closing-phase/time setting unit that sets a time from a reference point to a target closing phase of a first closing phase as a first target closing time, and sets a time obtained by adding up a time from the reference point to a target closing phase of a second closing phase and a delay time set to exclude a period in which a magnetic flux in the first closing phase possibly saturates as a second target closing time, and a closing control unit that generates and outputs a closing control signal to close each phase at the target closing time.

6 Claims, 9 Drawing Sheets

(56) References Cited

U.S. PATENT DOCUMENTS

2009/0134862 A1  5/2009  Kinoshita et al.
2012/0236443 A1* 9/2012  Kinoshita et al. ............... 361/36

FOREIGN PATENT DOCUMENTS

| | | |
|---|---|---|
| JP | 2008-135246 A | 6/2008 |
| JP | 2009-131106 A | 6/2009 |

* cited by examiner

INRUSH-CURRENT SUPPRESSING DEVICE AND INRUSH-CURRENT SUPPRESSING METHOD

FIELD

The present invention relates to an inrush-current suppressing device and an inrush-current suppressing method for suppressing an excessive excitation inrush current that possibly occurs in a three-phase transformer when three-phase power is input to the three-phase transformer.

BACKGROUND

Examples of a method of suppressing an excitation inrush current in a transformer include a phase-control input method in which a breaker is input in a specific phase of a three-phase power supply. Conventionally, the following technique is disclosed. That is, as for a first closing phase on which a closing operation is performed first among three phases, a closing phase in which an input magnetic-flux error that is the absolute value of a maximum error between a stationary magnetic flux and a residual magnetic flux at an input point becomes a minimum value is calculated and set as a target closing phase for the first closing phase based on the residual magnetic flux in the first closing phase and the already-obtained pre-arc characteristics and closing-time variation characteristics of the three-phase breaker while assuming an arbitrary reference phase of 0 degree as a reference point. As for the two remaining phases, a closing phase for which an input magnetic-flux error becomes a minimum value when a residual magnetic flux is zero is calculated and set as a target closing phase for the two remaining phases based on the already-obtained pre-arc characteristics and closing-time variation characteristics of the three-phase breaker while assuming the arbitrary reference phase of 0 degree as the reference point. The time obtained by adding up the time from the reference point to the target closing phase for the two remaining phases and the delay time corresponding to the integer multiple of the preset cycle of a three-phase power supply is set as a target closing time of the two remaining phases (for example, Patent Literature 1 mentioned below).

CITATION LIST

Patent Literature

Patent Literature 1: Japanese Patent No. 3804606 (pages 5 to 12, FIGS. 1 to 4)

SUMMARY

Technical Problem

As described above, with the technique described in Patent Literature 1 mentioned above, the closing phase in which the input magnetic-flux error that is the absolute value of the maximum error between the stationary magnetic flux and the residual magnetic flux at the input point becomes the minimum value is calculated, and the calculated closing phase is input as the first phase. However, an actual input point does not necessarily match a target input point because of the closing-time variation characteristics of the first phase. If the actual input point deviates from the target input point, the input magnetic-flux error is not zero but the stationary magnetic flux applied after input is offset by as much as this input magnetic-flux error and has an asynchronous waveform with respect to a zero reference axis. At this time, when an offset amount is large, the magnetic flux of an iron core reaches a saturation range and an excitation inrush current occurs in this period. In the period in which the excitation inrush current occurs, gap voltages of the two remaining phases are high. Therefore, when the two remaining phases are input in this period, an input point becomes earlier than an assumed input point, and then there is a problem that an excitation inrush current higher than an assumed excitation inrush current occurs.

The present invention has been achieved in view of the above problems, and an object of the present invention is to provide an inrush-current suppressing device and an inrush-current suppressing method capable of suppressing a maximum value of an excitation inrush current and suppressing occurrence of an excessive excitation inrush current.

Solution to Problem

In order to solve the above problem and in order to attain the above object, in an inrush-current suppressing device applied to a configuration in which three-phase alternating-current power is supplied to and cut off from a three-phase transformer via a three-phase breaker, for suppressing an excitation inrush current that possibly occurs in the three-phase transformer during input of the three-phase breaker, the inrush-current suppressing device of the present invention, includes: a residual-magnetic-flux calculation unit that obtains a residual magnetic flux in each phase generated within the three-phase transformer based on a voltage of each phase generated in the three-phase transformer before and after closing the three-phase breaker; an input magnetic-flux-error calculation unit that obtains a closing-phase input magnetic-flux error for every phase based on the residual magnetic flux in each phase and in consideration of pre-arc characteristics and closing-time variation characteristics of the three-phase breaker; a closing-order determination unit that determines a closing order of phases of the three-phase breaker based on the residual magnetic flux in each phase; a target-closing-phase setting unit that calculates a phase in which the input magnetic-flux error in a first closing phase determined by the closing-order determination unit becomes a minimum value and sets the calculated phase as a target closing phase of the first closing phase, and that calculates a phase in which the input magnetic-flux error in the two remaining phases becomes a minimum value while assuming a predetermined phase in a predetermined reference phase as a reference point and sets the calculated phase as a target closing phase of a second closing phase; a target-closing-time setting unit that sets a time from the reference point to the target closing phase of the first closing phase as a target closing time of the first closing phase, and that sets a time obtained by adding up a time from the reference point to the target closing phase of the two remaining phases and a predetermined delay time as a target closing time of the second closing phase; and a closing control unit that generates a closing control signal and outputs the closing control signal to the three-phase breaker so as to close each phase at the target closing time of each phase set by the target-closing-time setting unit in response to a closing instruction to the three-phase breaker. Additionally, the predetermined delay time is set to exclude a period in which a magnetic flux in the first closing phase possibly saturates because of the input magnetic-flux error in the first closing phase.

Advantageous Effects of Invention

The inrush-current suppressing device according to the present invention can suppress a maximum value of an excitation inrush current so as to suppress occurrence of an excessive excitation inrush current.

DESCRIPTION OF EMBODIMENTS

Exemplary embodiments of an inrush-current suppressing device and an inrush-current suppressing method according to the present invention will be explained below in detail with reference to the accompanying drawings. The present invention is not limited to the embodiments.

First Embodiment.

Figure 1:
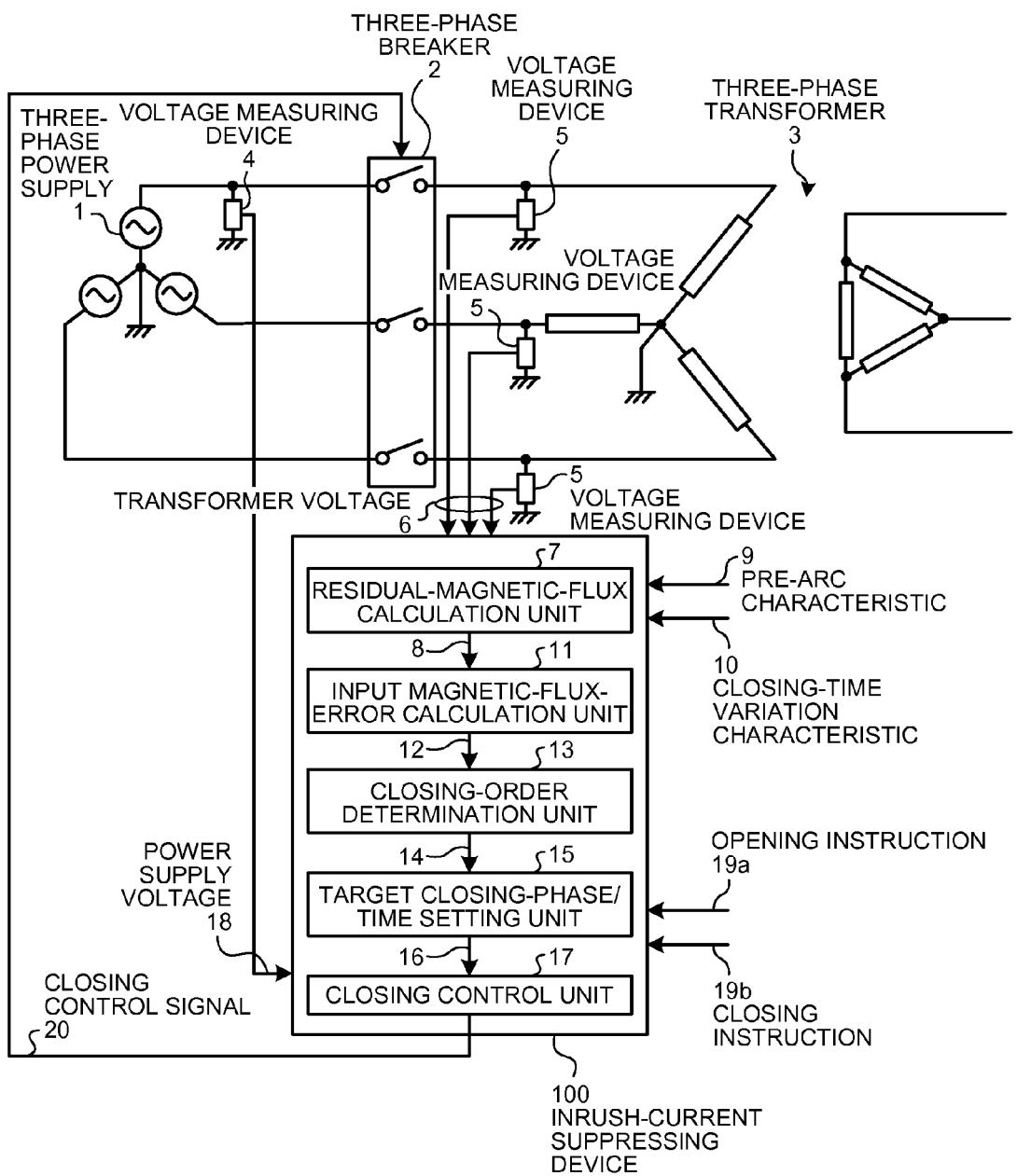
FIG. 1 is an explanatory diagram of an inrush-current suppressing device according to a first embodiment of the present invention.

FIG. 1 is an explanatory diagram of an inrush-current suppressing device according to a first embodiment of the present invention. An inrush-current suppressing device 100 according to the first embodiment is a device suitable to be used in a power system in which a three-phase power supply 1 is connected to a three-phase transformer 3 via a three-phase breaker 2. The inrush-current suppressing device 100 is configured to include a residual-magnetic-flux calculation unit 7, an input magnetic-flux-error calculation unit 11, a closing-order determination unit 13, a target closing-phase/time setting unit 15, and a closing control unit 17.

Figure 2:
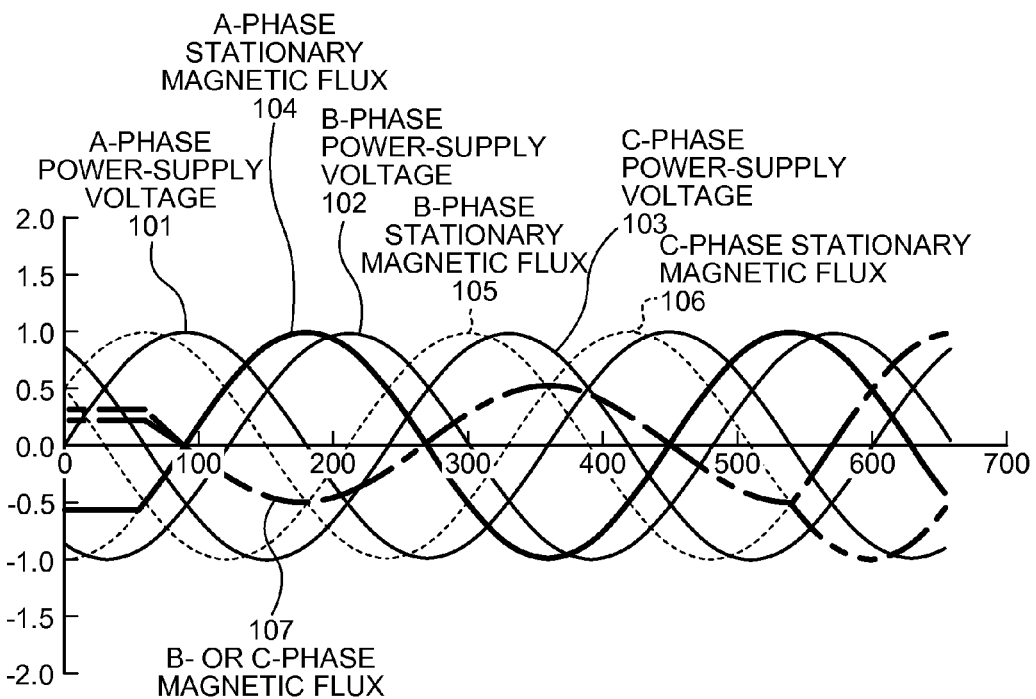
FIG. 2 depicts waveforms of magnetic fluxes generated in a three-phase transformer and waveforms of power supply voltages applied to the three-phase transformer after a first closing phase is input.

An operation performed by the inrush-current suppressing device 100 according to the first embodiment is explained next with reference to FIGS. 1 and 2. FIG. 2 depicts waveforms of magnetic fluxes generated in the three-phase transformer 3 and waveforms of power supply voltages applied to the three-phase transformer 3 when the three-phase breaker 2 is controlled to change from an open state to an input state.

First, in the present embodiment, any one of three phases (an A-phase, for example) of the three-phase power supply 1 is defined as a reference phase. As shown in FIG. 1, voltage measuring devices 4 and 5 are provided in the power system. A power supply voltage 18 is measured by the voltage measuring device 4 and input to the inrush-current suppressing device 100. Transformer voltages 6 generated in the three phases are measured by the voltage measuring devices 5, respectively, and input to the inrush-current suppressing device 100. As the voltage measuring devices 4 and 5, for example, voltage transformers for measuring high voltages are used.

In FIG. 1, the residual-magnetic-flux calculation unit 7 calculates residual magnetic fluxes 8 in the respective phases, that is, the residual magnetic fluxes in iron cores of the three-phase transformer 3 using the transformer voltages 6 (measured by the voltage measuring device 5) in the phases before and after an opening-instruction input time when an opening instruction 19a is input. The input magnetic-flux-error calculation unit 11 calculates a closing-phase input magnetic-flux error 12 for every phase in consideration of the residual magnetic fluxes 8 in the respective phases of the three-phase transformer 3 and pre-arc characteristics 9 and closing-time variation characteristics 10 of the three-phase breaker 2. Note that a map creation unit (not shown) that determines target closing phases in advance depending on patterns of the residual magnetic fluxes can replace the input magnetic-flux-error calculation unit 11.

The closing-order determination unit 13 determines a closing order 14 of the phases of the three-phase breaker 2. In the present embodiment, the phase in which an absolute value of the residual magnetic flux 8 is the highest among those of the residual magnetic fluxes 8 calculated by the residual-magnetic-flux calculation unit 7 is explained as a first closing phase. However, the assumption of the first closing phase is not limited to that in the present embodiment. For example, the phase in which the magnitude of the residual magnetic flux is the second largest can be assumed as the first closing phase as long as the residual magnetic fluxes in the two out of the three phases do not excessively differ from each other.

The target closing-phase/time setting unit 15 calculates a target closing time 16 of each of the phases with reference to a reference phase of 0 degree of the power supply voltage 18. That is, as for the first closing phase determined by the closing-order determination unit 13, the closing phase in which the input magnetic-flux error that is the absolute value of a maximum error between a stationary magnetic flux and the residual magnetic flux at an input point becomes a minimum value is calculated and set as the target closing phase for the first closing phase based on the residual magnetic flux in the first closing phase and the already-obtained pre-arc characteristics 9 and the closing-time variation characteristics 10 of the three-phase breaker 2 while assuming a point at which the reference phase is 0 degree as the reference point. In addition, a time from the reference point to the target closing phase of the first closing phase is set as a target closing time of the first closing phase. As for the two remaining phases, a closing phase in which the input magnetic-flux error becomes a minimum value when the residual magnetic flux is zero is calculated and set as a target closing phase of the two remaining phases (that is, the target closing phase for a second closing phase) based on the pre-arc characteristics 9 and the closing-time variation characteristics 10 of the three-phase breaker 2 while assuming a predetermined reference phase (of 0 degree, for example) as a reference point. In addition, a time obtained by adding up a time from the reference point to the target closing phase of the two remaining phases and preset a predetermined delay time is set as a target closing time of the two remaining phases. The predetermined delay time mentioned here is explained later in detail.

When a closing instruction 19b is input, the closing control unit 17 outputs a closing control signal 20 to the three-phase breaker 2 so as to close each of the phases at the target closing time 16 of each phase set by the target closing-phase/time setting unit 15 while assuming the point at which the reference phase of the power supply voltage 18 measured by the voltage measuring device 4 is 0 degree as the reference point.

FIG. 2 depicts waveforms of respective units when the residual magnetic fluxes of "−0.5 PU", "+0.2 PU", and "+0.3 PU" ("1.0 PU" is a maximum residual magnetic flux that possibly occurs in the transformer) remain in the A-phase, a B-phase, and a C-phase, respectively, the A-phase that serves as the first closing phase is input in a phase in which the input magnetic-flux error is zero and the two remaining phases are input in phases in which the input magnetic-flux error one cycle after the A-phase is input.

When three-phase power-supply voltages (an A-phase power-supply voltage 101, a B-phase power-supply voltage 102, and a C-phase power-supply voltage 103) as shown in FIG. 2 are applied, an A-phase stationary magnetic flux 104 is then generated after input of the A-phase, and magnetic fluxes 107 (a B-phase magnetic flux indicated by a chain line, and a C-phase magnetic flux indicated by a two-dot chain line) opposite to the A-phase and having half an amplitude of that of the A-phase are generated in the B-phase and the C-phase, respectively. These magnetic fluxes 107 are generated by inducing voltages opposite in phase to the A-phase and having amplitudes half as high as that of the A-phase in transformer-side voltages of the two remaining phases. Direct-current components caused by the residual magnetic fluxes remaining in the two remaining phases attenuate because of homogenization phenomenon of the magnetic fluxes in the iron cores and converge into zero. After input of the B-phase and C-phase that are the two remaining phases, the B-phase and C-phase magnetic fluxes change to stationary magnetic fluxes 105 and 106, respectively.

Referring back to FIG. 1, the three-phase transformer 3 includes a primary winding of a Y connection and a secondary winding of a Δ connection (that is, also a ternary winding), and a neutral point of the Y connection is grounded. The primary winding is connected to the three-phase power supply 1 via the three-phase breaker 2, and both input and cutoff of the three-phase power supply 1 to and from the three-phase transformer 3 are operated by opening or closing this three-phase breaker 2. While FIG. 1 depicts a case where the secondary or ternary winding of the three-phase transformer 3 is the Δ connection, a Y connection can be alternatively used as the secondary or ternary winding of the three-phase transformer 3.

When the three-phase transformer 3 is cut off from the three-phase power supply 1, the three-phase breaker 2 is controlled to collectively open the three phases by simultaneously actuating main contacts of the three phases similarly to an ordinary three-phase breaker. When the phases are input to the three-phase transformer 3 from the three-phase power supply 1, the three phases are controlled to be closed based on the closing phase set for each phase. That is, the three-phase breaker 2 is a three-phase breaker with a phase control function that can control the input of respective phases independently.

Figure 3:
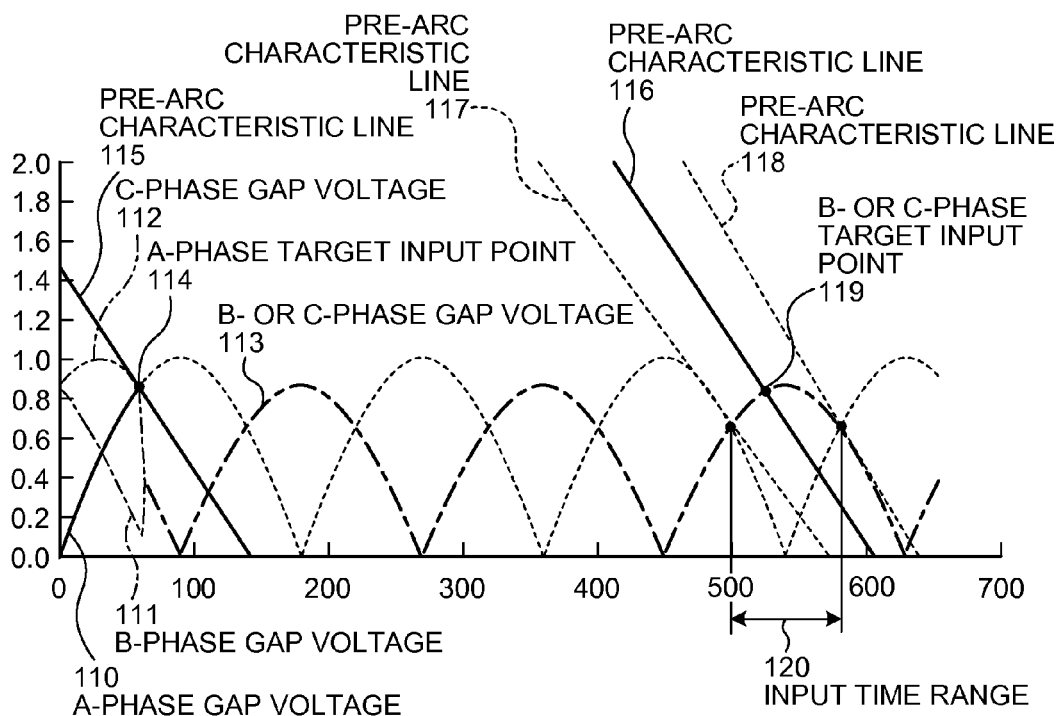
FIG. 3 is an explanatory diagram of target input points of a B-phase and a C-phase after an A-phase as a first closing phase is input.
Figure 4:
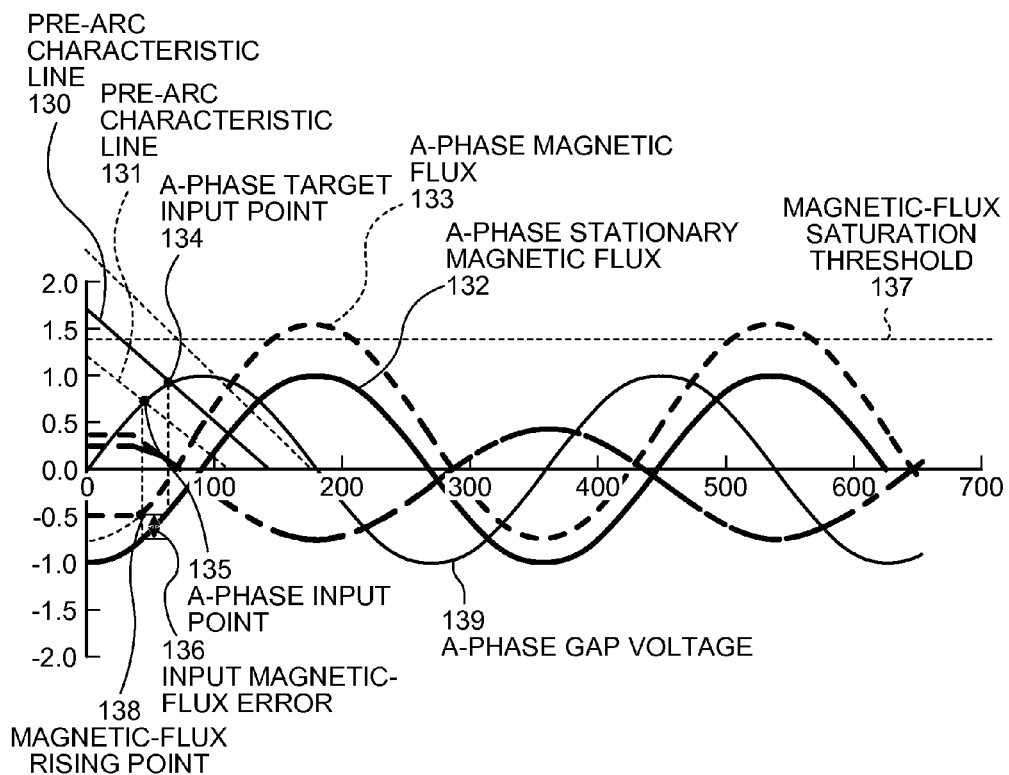
FIG. 4 is an explanatory diagram of a magnetic flux error and deviations of target input points resulting from pre-arc characteristics and closing-time variation characteristics.
Figure 5:
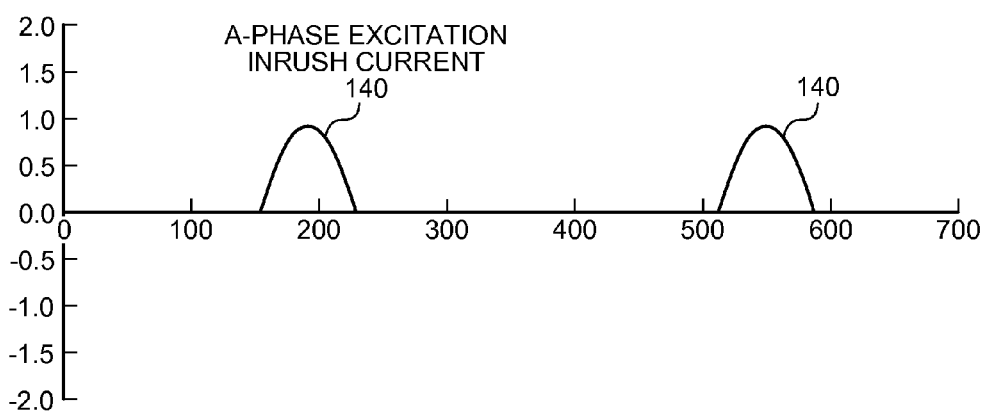
FIG. 5 is an explanatory diagram of an A-phase excitation inrush current resulting from a magnetic flux error.
Figure 6:
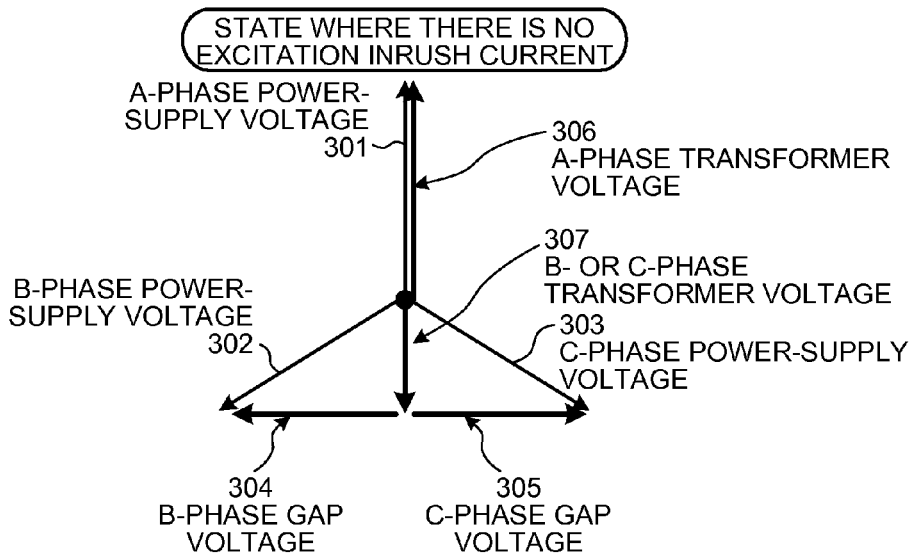
FIG. 6 depicts power supply voltages, transformer voltages, and gap voltages in a state where no excitation inrush current flows.
Figure 7:
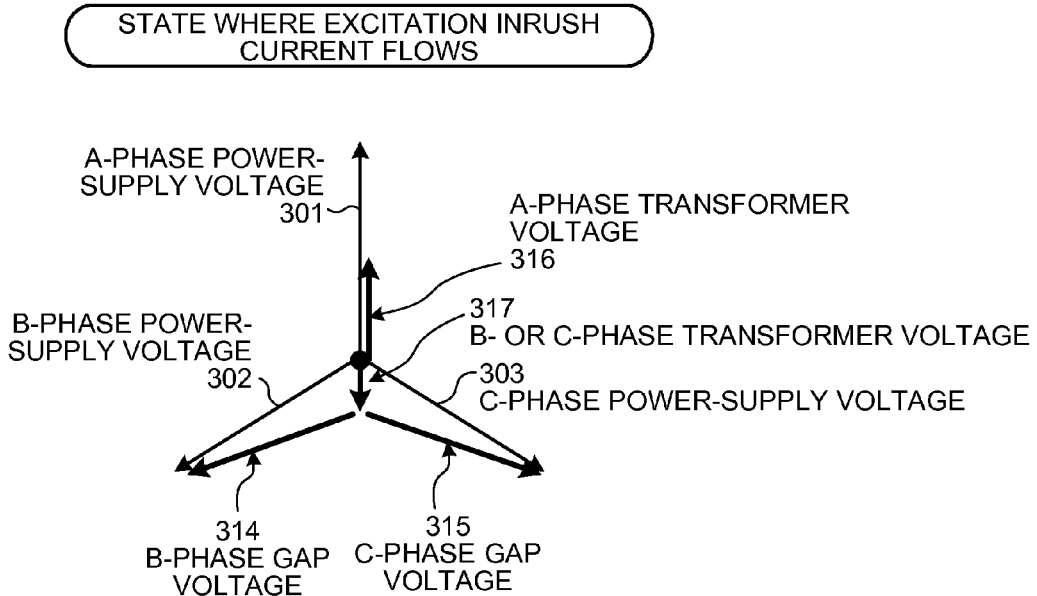
FIG. 7 depicts power supply voltages, transformer voltages, and gap voltages in a state where an excitation inrush current flows.
Figure 8:
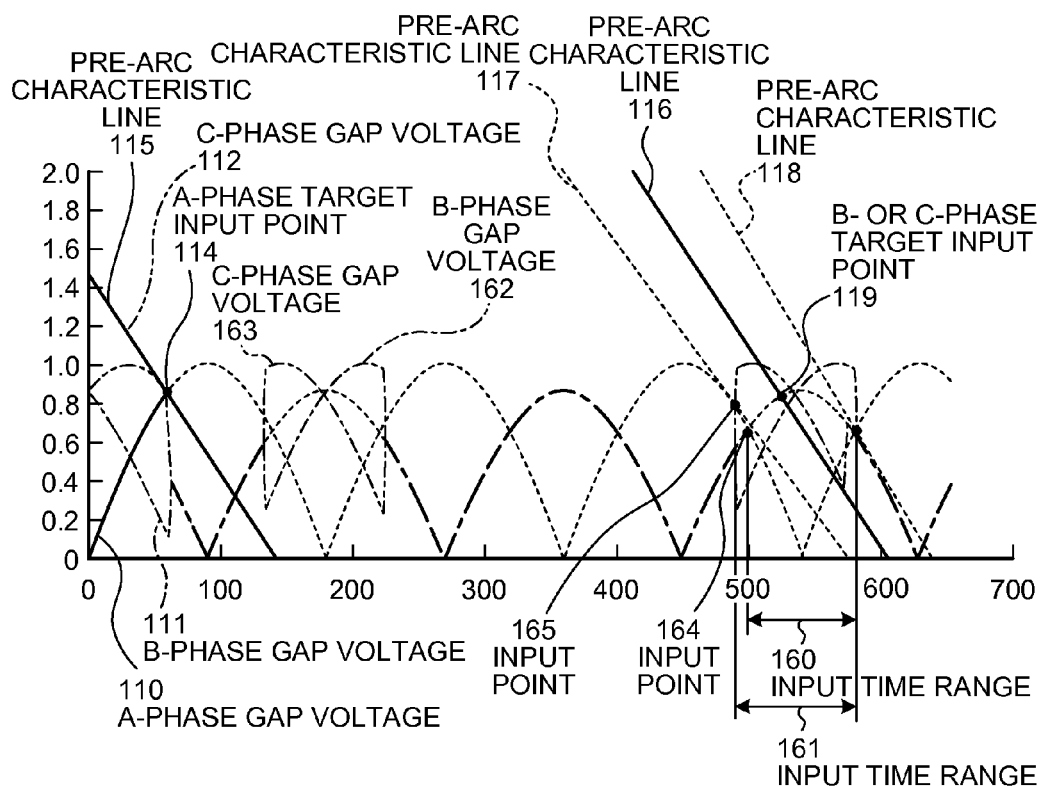
FIG. 8 is an explanatory diagram of an aspect in which a B-phase or a C-phase as a second closing phase is input at an earlier time because of an excitation inrush current.

The pre-arc characteristics and the closing-time variation characteristics when a transformer input operation is performed by the use of the three-phase breaker 2 as well as a magnetic flux error and an excitation inrush current generated due to these characteristics are explained next with reference to FIGS. 3 to 8. FIG. 3 is an explanatory diagram of target input points based on the pre-arc characteristics when the transformer input operation is performed by the use of the three-phase transformer 2. FIG. 4 is an explanatory diagram of the magnetic flux error and deviations of the target input points resulting from the pre-arc characteristics and the closing-time variation characteristics. FIG. 5 is an explanatory diagram of an excitation inrush current resulting from a magnetic flux error. FIG. 6 depicts power supply voltages, transformer voltages, and gap voltages in a state where no excitation inrush current flows. FIG. 7 depicts power supply voltages, transformer voltages, and gap voltages in a state where an excitation inrush current flows. FIG. 8 is an explanatory diagram of an aspect in which the second closing phase is input at an earlier time because of an excitation inrush current. The A-phase that serves as the first closing phase is in an input state and the B-phase or C-phase that serves as the second closing phase is in an open state in FIGS. 4 and 5.

First, FIG. 3 depicts the gap voltages and the pre-arc characteristics when the transformer input operation is performed by the use of the three-phase breaker 2. In FIG. 3, a point at which an A-phase gap voltage 110 intersects a pre-arc characteristic line 115 corresponds to a target input point 114 of the A-phase serving as the first closing phase (the A-phase target input point 114).

In this case, the power supply voltages in the two remaining phases (the B-phase and the C-phase) are a B-phase power-supply voltage 302 and a C-phase power-supply voltage 303 shown in FIG. 6, respectively. If a phase of an A-phase power-supply voltage 301 that is a reference phase is θ, the B-phase power-supply voltage 302 and the C-phase power-supply voltage 303 are expressed as follows.

$$B\text{-phase power-supply voltage}=\sin(\theta-120°) \quad (1)$$

$$C\text{-phase power-supply voltage}=\sin(\theta-240°) \quad (2)$$

On the other hand, a B-phase transformer voltage and a C-phase transformer voltage after the input of the A-phase (not shown) are expressed as follows.

$$B\text{-phase transformer voltage}=\sin(\theta-180°)/2 \quad (3)$$

$$C\text{-phase transformer voltage}=\sin(\theta-180°)/2 \quad (4)$$

Therefore, a B-phase gap voltage and a C-phase gap voltage that are gap voltages of the two remaining phases are expressed as follows.

$$B\text{-phase gap voltage}=(B\text{-phase power-supply voltage})-(B\text{-phase transformer voltage})=-\sqrt{3}/2\times\sin(\theta-90°) \quad (5)$$

$$C\text{-phase gap voltage} = (C\text{-phase power-supply voltage}) - (C\text{-phase transformer voltage}) = +\sqrt{3}/2 \times \sin(\theta - 90°) \quad (6)$$

Furthermore, FIG. 3 depicts a B- or C-phase gap voltage 113 (a B-phase gap voltage 111 and a C-phase gap voltage 112 before the A-phase target input point 114) that is an absolute value of each of the B-phase gap voltage and the C-phase gap voltage (which are equal as obvious from the Equations (5) and (6) mentioned above). As for the target input point of the two remaining phases, a B- or C-phase target input point 119 (an intersection between the B- or C-phase gap voltage 113 and a pre-arc characteristic line 116) is determined so as to have the minimum input magnetic-flux error in an input time range 120 in which the B- or C-phase gap voltage 113 intersects pre-arc characteristic lines 117 and 118 in view of the closing-time variation characteristics and the pre-arc characteristics.

However, as shown in FIG. 4, when the input point of the A-phase that is the first closing phase is not an A-phase target input point 134 that is an intersection between an A-phase gap voltage 139 and a pre-arc characteristic line 130 but an A-phase input point 135 that is an intersection between the A-phase gap voltage 139 and a pre-arc characteristic line 131 because of the closing-time variation characteristics, an A-phase magnetic flux 133 draws a curve rising from a magnetic-flux rising point 138. Therefore, an input magnetic-flux error 136 occurs. That is, the A-phase magnetic flux 133 is offset from an A-phase stationary magnetic flux 132 by as much as an increment of this input magnetic-flux error 136 and exceeds a magnetic-flux saturation threshold 137. Accordingly, an A-phase excitation inrush current 140 as shown in FIG. 5 occurs.

When the A-phase excitation inrush current 140 shown in FIG. 5 occurs, an A-phase transformer voltage 306 shown in FIG. 6 changes to an A-phase transformer voltage 316 shown in FIG. 7. In addition, a B- or C-phase transformer voltage 307 shown in FIG. 6 changes to a B- or C-phase transformer voltage 317 shown in FIG. 7. Accordingly, a B-phase gap voltage 304 and a C-phase gap voltage 305 shown in FIG. 6 change (increase) to a B-phase gap voltage 314 and a C-phase gap voltage 315 shown in FIG. 7, respectively.

With reference to FIG. 8, in a period in which the A-phase excitation inrush current 140 occurs, a B-phase gap voltage 162 and a C-phase gap voltage 163 increase as well. Therefore, when the closing-time variation characteristics indicate a large variation, an input point 164 changes to an input point 165 and an assumed input time range 160 extends to an input time range 161. As a result, the input of the two remaining phases causes an input magnetic-flux error greater than an assumed input magnetic-flux error occurs, and an excitation inrush current higher than an assumed excitation inrush current occurs.

The matters described above are those also described in "Technical Problem" Section, that is, the problem that "an input point becomes earlier than an assumed input point, and then an excitation inrush current higher than an assumed excitation inrush current occurs".

Figure 9:
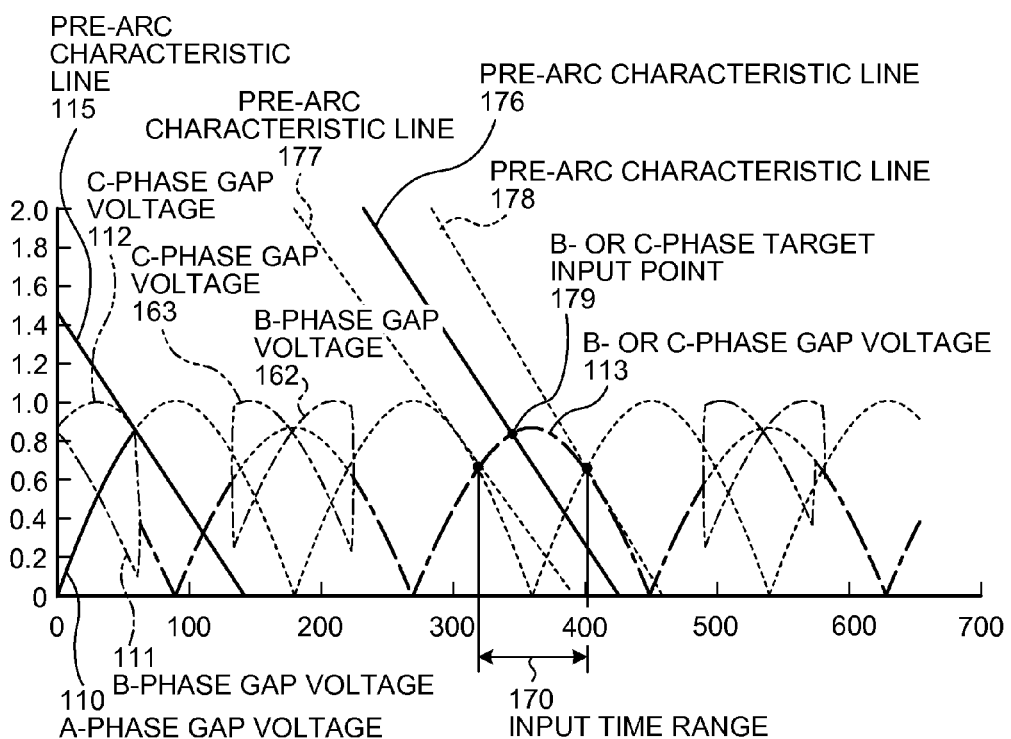
FIG. 9 is an explanatory diagram of a control method according to the first embodiment.

To solve this problem, according to the first embodiment, a control is executed to set the target input points of the two remaining phases within the period in which the excitation inrush current as shown in FIG. 5 does not occur. FIG. 9 is an explanatory diagram of a control method for suppressing the occurrence of the excitation inrush current higher than the assumed excitation inrush current according to the present embodiment. Specifically, the control is executed as follows.

First, attention is paid to the fact that the excitation inrush current that occurs because of the first closing phase occurs repeatedly at 360° intervals, and that the target input point of the two remaining phases is present at 180° intervals. Therefore, the delay time of the two remaining phases (a delay time with respect to a conventional input time) is controlled to be either reduced by 0.5 cycle or extended by "0.5+n" cycle (where n is an integer). In other words, the control is executed to set the delay time of the two remaining phases to a time that corresponds to half a cycle of the three-phase alternating-current power or an odd multiple of the half cycle. This control makes it possible to input the B-phase and the C-phase in the period in which no excitation inrush current occurs, and to ensure the input time range within the scope of the assumption. An example shown in FIG. 9 is a case where the delay time of the two remaining phases is controlled to be reduced by 0.5 cycle (the delay time for the input of the B-phase and C-phase is set to the half cycle). When a C-phase target input point 279 is determined based on a pre-arc characteristic line 176 and the B- or C-phase gap voltage 113, an input time range 170 in light of pre-arc characteristic lines 177 and 178 can be assumed. This control makes it possible to input the B-phase and C-phase in the period in which no excitation inrush current occurs, and to ensure the input time range within the scope of the assumption.

In the present embodiment, an example of setting the delay time of the two remaining phases to the time that corresponds to half the cycle of the three-phase alternating-current power has been disclosed. However, the present invention is not limited thereto. What is important is that the delay time of the two remaining phases is set to the time that excludes a period in which the magnetic flux in the first closing phase possibly saturates because of the input magnetic-flux error in the first closing phase. It eventually suffices that the two remaining phases can be input in the period in which no excitation inrush current occurs, and this concept also forms the spirit of the present invention.

As described above, the inrush-current suppressing device according to the first embodiment calculates the period in which the excitation inrush current that exceeds the magnetic flux saturation threshold occurs due to the offset of the magnetic flux in the first phase from the input magnetic-flux error during the input of the first closing phase, and determines the target input point of the two remaining phases that are delayed phases in the period in which no excitation inrush current occurs. Therefore, it is possible to input the two remaining phases in the period in which the gap voltages in the two remaining phases are not unstable. Furthermore, this control makes it possible to input the two remaining phases within the assumed input time range, thereby suppressing an unintended excessive excitation inrush current.

Second Embodiment.

Figure 10:
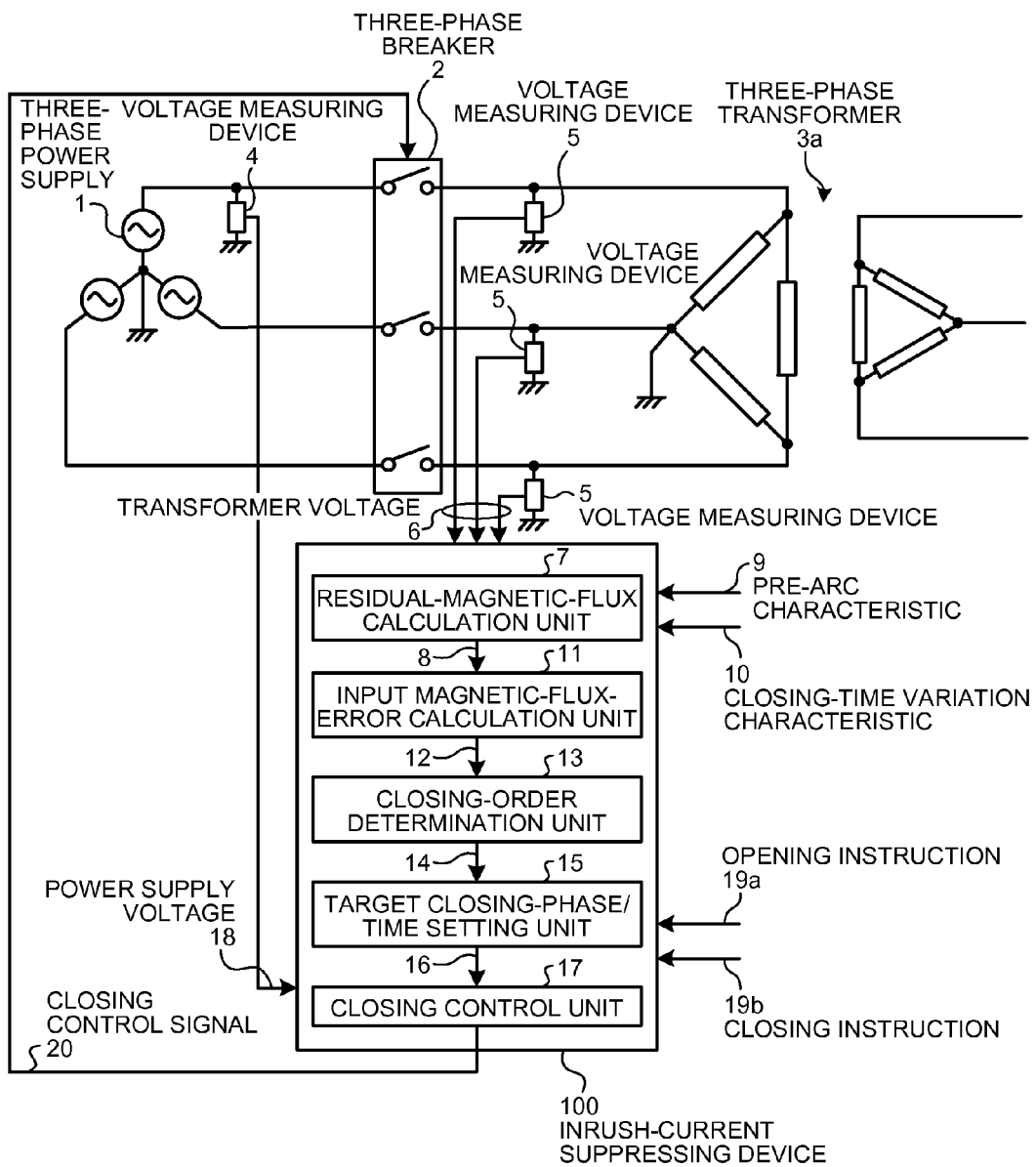
FIG. 10 is an explanatory diagram of an inrush-current suppressing device according to a second embodiment of the present invention.

FIG. 10 is an explanatory diagram of an inrush-current suppressing device according to a second embodiment of the present invention. In the power system shown in FIG. 1, the three-phase transformer 3 of Y-Δ connections configured so that a transformer primary side is the Y connection and a transformer secondary side is the Δ connection is shown as an example. In a power system shown in FIG. 10, a three-phase transformer 3a of Δ-Δ connections configured so that both a transformer primary side and a transformer secondary side are Δ connections is shown as an example. While FIG. 10 depicts a case where a secondary winding or a ternary winding is the Δ connection, a Y connection can be alternatively used as the secondary winding or the ternary winding, similarly to the first embodiment. Configurations of the second embodiment other than the above points are the same or equivalent to the configurations of the first embodiment, and therefore constituent elements common to the first and second embodiments are denoted by like reference signs and redundant explanations thereof will be omitted.

When the transformer primary side is the Δ connection, an excitation current does not occur in the three-phase transformer during the input of the first phase but the excitation current occurs for the first time during the input of the second phase. That is, as it is assumed that the A-phase power-supply voltage is ypa, transformer voltages yta, ytb, and ytc during the input of the first phase (during the input of the A-phase, for example) are expressed as follows.

$$A\text{-phase transformer voltage } yta = A\text{-phase power-supply voltage } ypa \qquad (7)$$

$$B\text{-phase transformer voltage } ytb = A\text{-phase power-supply voltage } ypa \qquad (8)$$

$$C\text{-phase transformer voltage } ytc = A\text{-phase power-supply voltage } ypa \qquad (9)$$

Next, at the time of the input of the second phase (the input of the B-phase subsequent to the input of the A-phase), a rated voltage is applied only to both ends of an A-phase transformer winding and half a voltage opposite in phase to the rated voltage is applied to each of a B-phase transformer winding and a C-phase transformer winding. That is, as it is assumed that the B-phase power-supply voltage is ypa, a potential difference on both ends of each of the phase windings is expressed as follows.

$$\text{Potential difference on both ends of } A\text{-phase winding} = ypa - ypb = \sqrt{(3)}\sin(\theta+30) \qquad (10)$$

$$\text{Potential difference on both ends of } B\text{-phase winding} = -(ypa-ypb)/2 = -\sqrt{(3)}/2 \sin(\theta+30) \qquad (11)$$

$$\text{Potential difference on both ends of } C\text{-phase winding} = -(ypa-ypb)/2 = -\sqrt{(3)}2 \sin(\theta+30) \qquad (12)$$

Moreover, the C-phase transformer voltage and the C-phase gap voltage are expressed as follows.

$$C\text{-phase transformer voltage} = ypa - (ypa-ypb)/2 = (ypa+ypb)/2 \qquad (13)$$

$$C\text{-phase gap voltage} = ypc - (ypa+ypb)/2 \qquad (14)$$

However, at the time of inputting the first closing phase and the second closing phase, an excitation inrush current often occurs because of the closing-time variation characteristics similarly to the first embodiment. The potential difference on the both ends of each of the phase windings in the period in which the excitation inrush current occurs are expressed as follows because a voltage decrement ΔV corresponding to (excitation inrush current)×(system impedance) is generated.

$$\text{Potential difference on both ends of } A\text{-phase winding} = ypa - ypb - \Delta V = \sqrt{(3)}\sin(\theta+30) - \Delta V \qquad (15)$$

$$\text{Potential difference on both ends of } B\text{-phase winding} = -(ypa-ypb)/2 - \Delta V = -\sqrt{(3)}/2 \sin(\theta+30) - \Delta V \qquad (16)$$

$$\text{Potential difference on both ends of } C\text{-phase winding} = -(ypa-ypb)/2 - \Delta V = -\sqrt{3}/2 \sin(\theta+30) - \Delta V \qquad (17)$$

Furthermore, the C-phase transformer voltage and the C-phase gap voltage are expressed as follows.

$$C\text{-phase transformer voltage} = ypa - ((ypa-ypb)/2 - \Delta V) = (ypa+ypb)/2 + \Delta V \qquad (18)$$

$$C\text{-phase gap voltage} = ypc - (ypa+ypb)/2 - \Delta V \qquad (19)$$

As described above, when the C-phase that is the delayed phase is input in the period in which the excitation inrush current occurs, the C-phase gap voltage varies, and therefore it is impossible to input the C-phase in a desired phase. FIGS. 11 to 16 are explanatory diagrams of states at this time. Among these drawings, FIGS. 11 to 14 correspond to FIGS. 2 to 5 referred to in the explanations of the first embodiment, respectively, and FIGS. 15 and 16 correspond to FIGS. 8 and 9 referred to in the explanations of the first embodiment, respectively.

Figure 11:
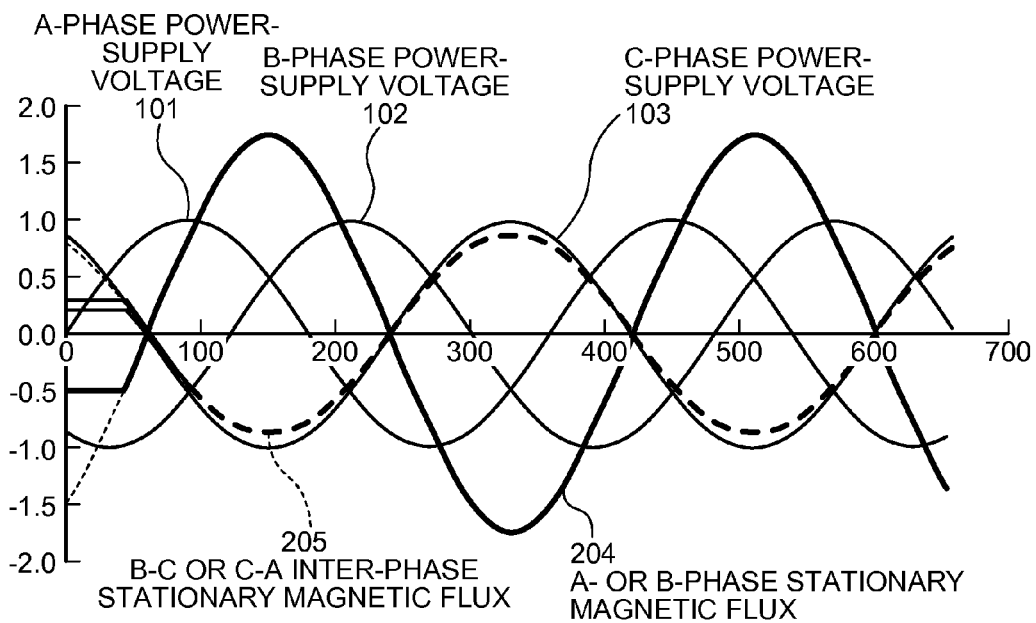
FIG. 11 depicts waveforms of magnetic fluxes generated in a three-phase transformer and waveforms of power supply voltages applied to the three-phase transformer after a second closing phase is input.

FIG. 11 depicts waveforms of respective units when the residual magnetic fluxes of "−0.5 PU", "+0.2 PU", and "+0.3 PU" remain in the A-phase, the B-phase, and the C-phase, respectively, the A-phase that serves as the first closing phase is input in the phase in which the input magnetic-flux error is zero.

In FIG. 11, an A- or B-phase stationary magnetic flux 204 is generated after the input of the A-phase, a B-C or C-A inter-phase stationary magnetic flux 205 opposite in phase to an A-B inter-phase stationary magnetic flux and having an amplitude half as high as that of the A-B inter-phase stationary magnetic flux is generated between the A-phase and the B-phase or the C-phase and the A-phase. FIG. 11 differs from FIG. 2 in that waveforms of the stationary magnetic fluxes are those of the inter-phase magnetic fluxes (and is √3 times as large as those of the stationary magnetic fluxes shown in FIG. 2). This is because the primary side of the three-phase transformer 3a described in the present embodiment is the Δ connection. The amplitude of the B-C inter-phase or C-A inter-phase stationary magnetic flux is half the amplitude of the A-B inter-phase magnetic flux because voltages opposite in the phase to and half in the amplitude of the voltage in the A-phase are induced between the two remaining phases after the input of the A-phase. FIG. 11 is identical to FIG. 2 in this point. Thereafter, the direct-current components caused by the residual magnetic fluxes remaining in the two remaining phases attenuate because of the homogenization phenomenon of the magnetic fluxes in the iron cores and converge into zero.

Figure 12:
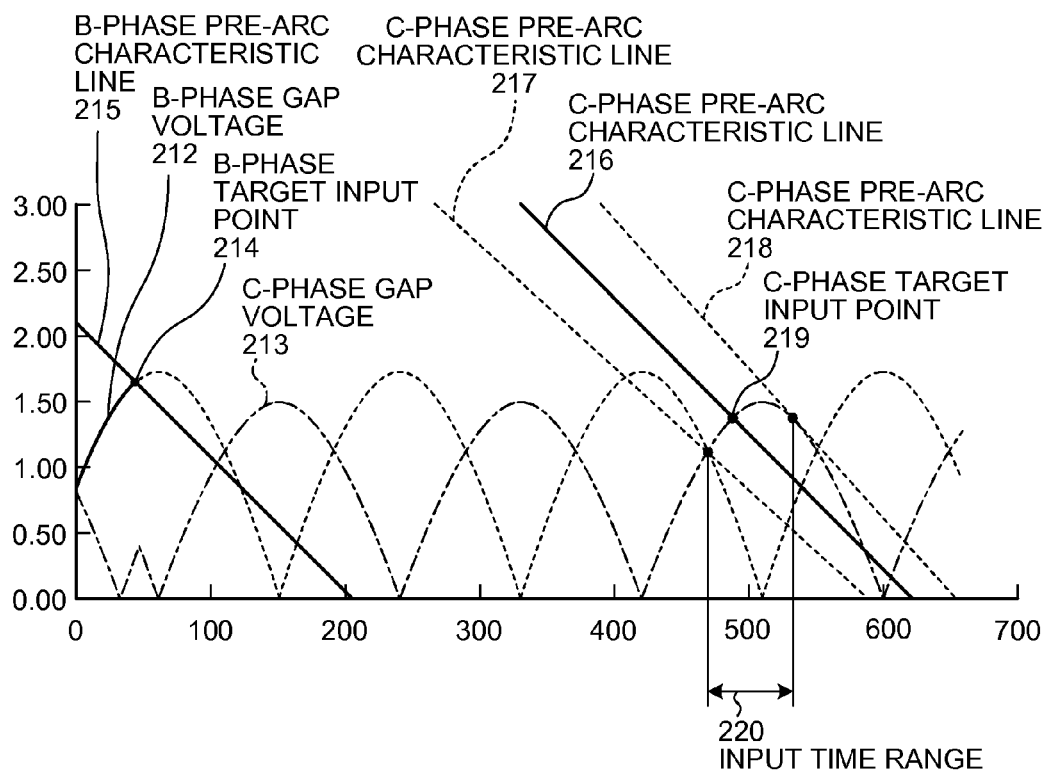
FIG. 12 is an explanatory diagram of target input points of a C-phase after a B-phase as a second closing phase is input.

FIG. 12 depicts the B-phase gap voltage, the C-phase gap voltage, and the pre-arc characteristics when the A-phase is input as the first closing phase and the B-phase is input as the second closing phase. In FIG. 12, a point at which a B-phase gap voltage 212 intersects a B-phase pre-arc characteristic line 215 corresponds to a target input point 214 of the B-phase serving as the second closing phase (the B-phase target input point 214).

FIG. 12 depicts a C-phase gap voltage 213 that is the absolute value of the C-phase gap voltage. A C-phase target input point 219 is shown as an intersection between the C-phase gap voltage 213 and a C-phase pre-arc characteristic line 216. The C-phase target input point 219 is determined so as to have the minimum input magnetic-flux error in an input time range 220 in which the C-phase gap voltage 213 intersects pre-arc characteristic lines 217 and 218 in view of the closing-time variation characteristics and the pre-arc characteristics.

Figure 13:
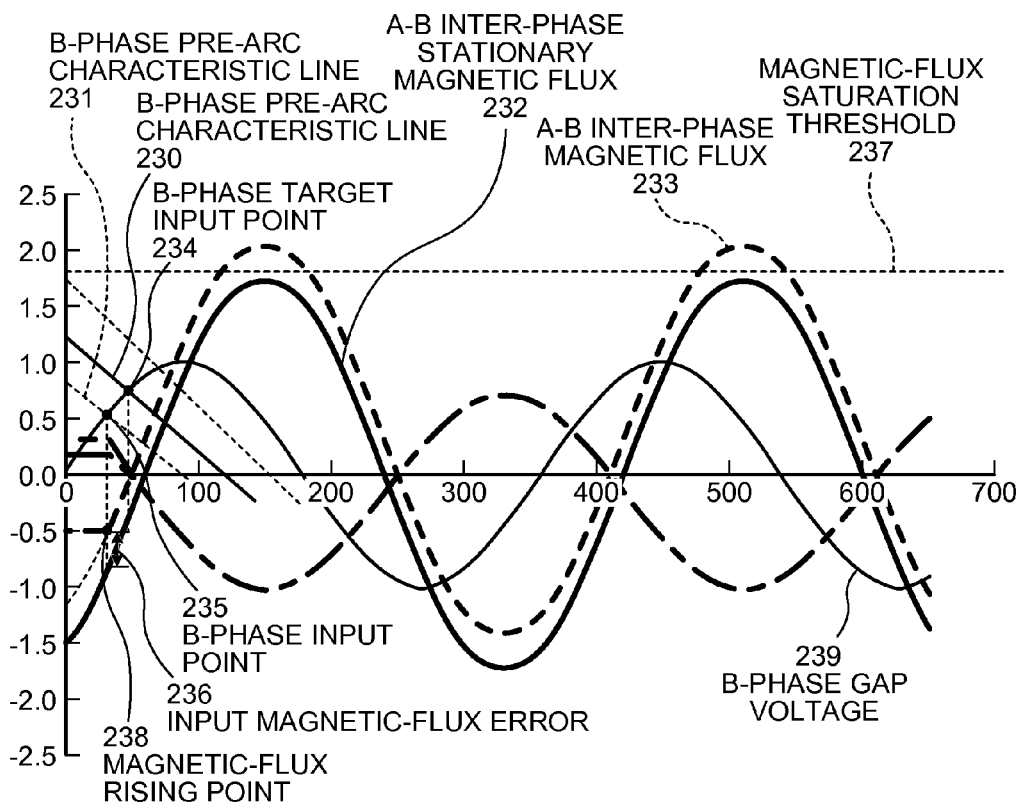
FIG. 13 is an explanatory diagram of a magnetic flux error and deviations of target input points resulting from pre-arc characteristics and closing-time variation characteristics.

However, as shown in FIG. 13, when the input point of the B-phase that is the second closing phase is not a B-phase target input point 234 that is an intersection between a B-phase gap voltage 239 and a B-phase pre-arc characteristic line 230 but a B-phase input point 235 that is an intersection between the B-phase gap voltage 239 and a B-phase pre-arc characteristic line 231 because of the closing-time variation characteristics, an A-B inter-phase magnetic flux 233 draws a curve rising from a magnetic-flux rising point 238. Therefore, an input magnetic-flux error 236 occurs. That is, the A-B inter-phase magnetic flux 233 is offset from an A-B inter-phase stationary magnetic flux 232 by an increment of this input magnetic-flux error 236 and exceeds a magnetic-flux saturation threshold 237. As a result, an A-B inter-phase excitation inrush current 240 as shown in FIG. 14 occurs.

Figure 14:
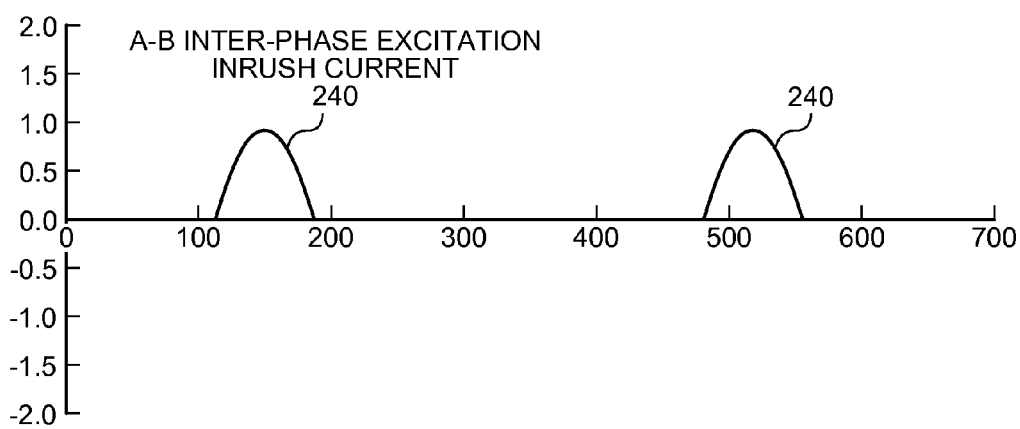
FIG. 14 is an explanatory diagram of an A-B inter-phase excitation inrush current resulting from a magnetic flux error.

When the A-B inter-phase excitation inrush current 240 shown in FIG. 14 occurs, the potential differences on the both ends of each of the phase windings change as expressed by the Equations (15) to (17). Accordingly, the C-phase transformer voltage changes as expressed by the Equation (18), and the C-phase gap voltage changes as expressed by the Equation (19). As a result, it is impossible to input the C-phase in a desired phase.

Figure 15:
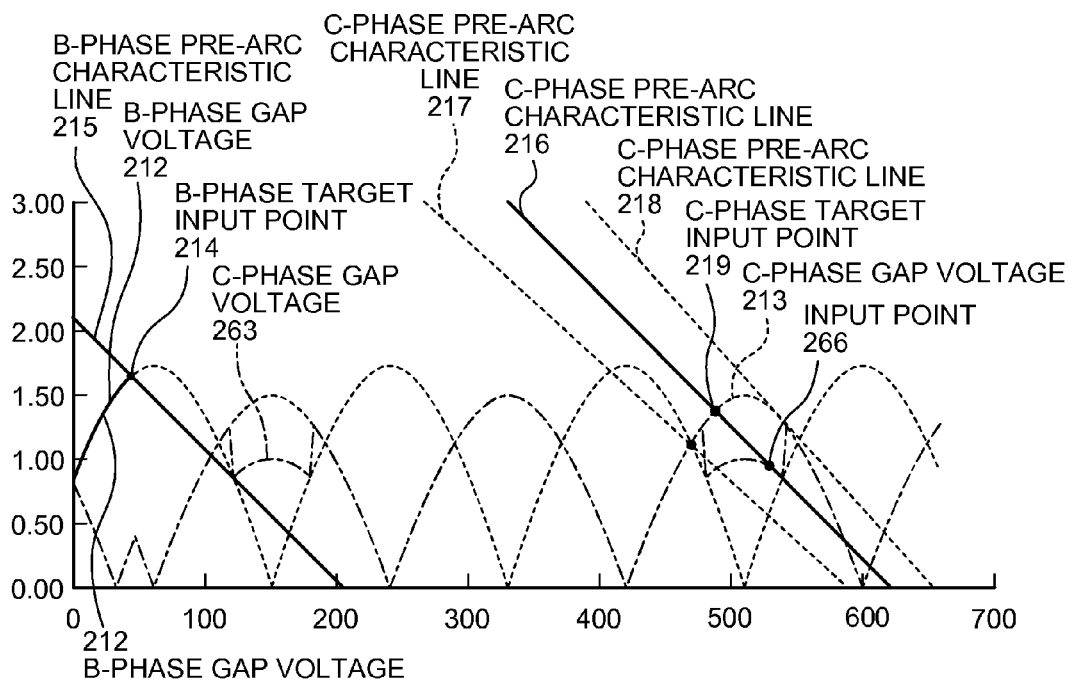
FIG. 15 is an explanatory diagram of an aspect in which a C-phase as a third closing phase is input at an earlier time because of an excitation inrush current.

With reference to the example shown in FIG. 15, where there is no closing time variation, the C-phase target input point 219 that is the intersection between the C-phase pre-arc characteristic line 216 and the C-phase gap voltage 213 for a case where no excitation inrush current flows changes to an unintended input point 266 that is an intersection between the C-phase pre-arc characteristic line 218 and a C-phase gap voltage 263.

To solve this problem, according to the second embodiment, similarly to the first embodiment, a control is executed to set the target input point of the one remaining phase (a third closing phase) within a time that excludes the period in which the excitation inrush current occurs at the timing at which the two preceding phases are input. This control makes it possible to input the third closing phase in a desired phase without being influenced by the preceding input phases.

Figure 16:
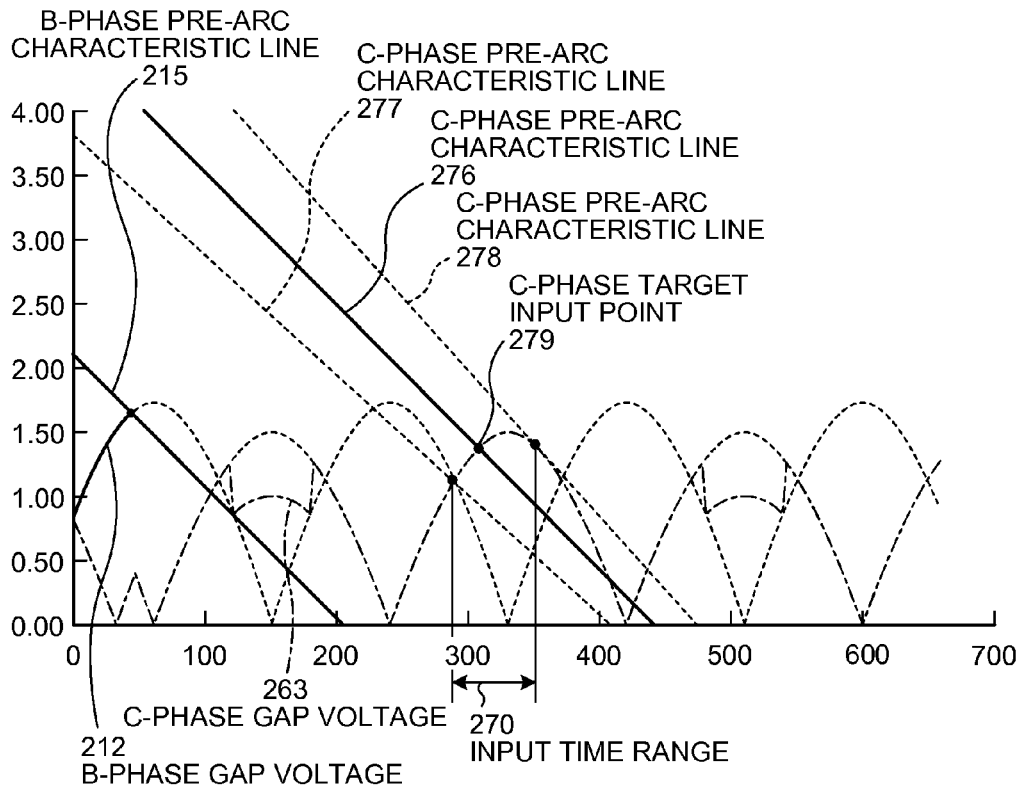
FIG. 16 is an explanatory diagram of a control method according to the second embodiment.

An example shown in FIG. 16 depicts a case of executing a control to reduce the delay time of the one remaining phase (the C-phase in this example) (a delay time with respect to a conventional input time) by 0.5 cycle (the delay time for the input of the C-phase is set to the half cycle). When a C-phase target input point 279 is determined based on a C-phase pre-arc characteristic line 276 and the C-phase gap voltage 263, an input time range 270 in light of C-phase pre-arc characteristic lines 277 and 278 can be assumed. This control makes it possible to input the C-phase in the period in which no excitation inrush current occurs, and to ensure the input time range within the scope of the assumption.

In the present embodiment, an example of setting a delay time of one remaining phase to a time that corresponds to half a cycle of a three-phase alternating-current power supply has been disclosed. However, the present invention is not limited thereto. What is important is that the delay time of the one remaining phase (the third closing phase) is set to the time that excludes the period in which the magnetic flux between the first and second closing phases possibly saturates because of the input magnetic-flux errors in the first and second closing phases. It eventually suffices that the one remaining phase can be input in the period in which no excitation inrush current occurs, and this concept also forms the spirit of the present invention.

As described above, the inrush-current suppressing device according to the second embodiment calculates the period in which the excitation inrush current that exceeds the magnetic flux saturation threshold occurs due to the offset of the magnetic flux in the second phase from the input magnetic-flux error during the input of the second closing phase, and determines the target input point of the one remaining phase that is the delayed phases in the period in which no excitation inrush current occurs. Therefore, it is possible to stabilize the gap voltage of the one remaining phase, to input the one remaining phase in an assumed and desired phase, thereby suppressing an unintended excessive excitation inrush current.

The configurations explained in the first and second embodiments described above are only an example of the configuration of the present invention. Therefore, it is needless to mention that these configurations can be combined with other commonly known techniques and can be modified within a range not departing from the scope of the present invention, such as omitting a part of the configurations.

INDUSTRIAL APPLICABILITY

As described above, the inrush-current suppressing device according to the present invention is useful as an invention that can suppress a maximum value of an excitation inrush current so as to suppress occurrence of an excessive excitation inrush current.

REFERENCE SIGNS LIST

1 three-phase power supply
2 three-phase breaker
3, 3a three-phase transformer
4, 5 voltage measuring device
6 transformer voltage
7 residual-magnetic-flux calculation unit
8 residual magnetic flux
9 pre-arc characteristic
10 closing-time variation characteristic
11 input magnetic-flux-error calculation unit
12 input magnetic-flux error
13 closing-order determination unit
14 closing order
15 target closing-phase/time setting unit
16 target closing time
17 closing control unit
18 power supply voltage
19a opening instruction
19b closing instruction
20 closing control signal
100 inrush-current suppressing device
101 A-phase power-supply voltage
102 B-phase power-supply voltage
103 C-phase power-supply voltage
104 A-phase stationary magnetic flux
105 B-phase stationary magnetic flux
106 C-phase stationary magnetic flux
107 B- or C-phase magnetic flux
110, 139 A-phase gap voltage
111 B-phase gap voltage
112 C-phase gap voltage
113 B- or C-phase gap voltage
114 A-phase target input point
115 to 118, 130, 131, 177, 178 pre-arc characteristic line
119, 179 B- or C-phase target input point
120, 160, 161, 170 input time range
132 A-phase stationary magnetic flux
133 A-phase magnetic flux
134 A-phase target input point
135 A-phase input point
136 input magnetic-flux error
137 magnetic-flux saturation threshold
138 magnetic-flux rising point
140 A-phase excitation inrush current
162 B-phase gap voltage
163 C-phase gap voltage
164, 165, 266 input point
204 A- or B-phase stationary magnetic flux
205 B-C or C-A inter-phase stationary magnetic flux
212 B-phase gap voltage
213, 239 C-phase gap voltage
214, 234 B-phase target input point
215, 230, 231 B-phase pre-arc characteristic line 216 to 218, 276 to 278 C-phase pre-arc characteristic line
219 C-phase target input point
220, 270 input time range
232 A-B inter-phase stationary magnetic flux
233 A-B inter-phase magnetic flux
234 B-phase target input point
235 B-phase input point
236 input magnetic-flux error
237 magnetic-flux saturation threshold
238 magnetic-flux rising point
240 A-B inter-phase excitation inrush current
263 C-phase gap voltage
301 A-phase power-supply voltage
302 B-phase power-supply voltage
303 C-phase power-supply voltage
304, 314 B-phase gap voltage
305, 315 C-phase gap voltage
306, 316 A-phase transformer voltage
307, 317 B- or C-phase transformer voltage

The invention claimed is:

1. An inrush-current suppressing device applied to a configuration in which three-phase alternating-current power is supplied to and cut off from a three-phase transformer having a primary winding of a Y connection via a three-phase breaker, for suppressing an excitation inrush current that possibly occurs in the three-phase transformer during input of the three-phase breaker, the inrush-current suppressing device comprising:
 a residual-magnetic-flux calculation unit that obtains a residual magnetic flux in each phase generated within the three-phase transformer based on a voltage of each phase generated in the three-phase transformer before and after closing the three-phase breaker;
 an input magnetic-flux-error calculation unit that obtains a closing-phase input magnetic-flux error for every phase based on the residual magnetic flux in each phase and in consideration of pre-arc characteristics and closing-time variation characteristics of the three-phase breaker;
 a closing-order determination unit that determines a closing order of phases of the three-phase breaker based on the residual magnetic flux in each phase;
 a target-closing-phase setting unit that calculates a phase in which the input magnetic-flux error in a first closing phase determined by the closing-order determination unit becomes a minimum value and sets the calculated phase as a target closing phase of the first closing phase, and that calculates a phase in which the input magnetic-flux error in the two remaining phases becomes a minimum value while assuming a predetermined phase in a predetermined reference phase as a reference point and sets the calculated phase as a target closing phase of a second closing phase;
 a target-closing-time setting unit that sets a time from the reference point to the target closing phase of the first closing phase as a target closing time of the first closing phase, and that sets a time obtained by adding up a time from the reference point to the target closing phase of the two remaining phases and a predetermined delay time as a target closing time of the second closing phase; and
 a closing control unit that generates a closing control signal and outputs the closing control signal to the three-phase breaker so as to close each phase at the target closing time of each phase set by the target-closing-time setting unit in response to a closing instruction to the three-phase breaker, wherein
 the predetermined delay time is set to exclude a period in which a magnetic flux in the first closing phase possibly saturates because of the input magnetic-flux error in the first closing phase.

2. The inrush-current suppressing device according to claim 1, wherein the predetermined delay time is set to a time that is half a cycle of the three-phase alternating-current power or an odd multiple of a half cycle of the three-phase alternating-current power.

3. An inrush-current suppressing device applied to a configuration in which three-phase alternating-current power is supplied to and cut off from a three-phase transformer having a primary winding of a Δ connection via a three-phase breaker, for suppressing an excitation inrush current that possibly occurs in the three-phase transformer during input of the three-phase breaker, the inrush-current suppressing device comprising:
 a residual-magnetic-flux calculation unit that obtains a residual magnetic flux in each phase generated within the three-phase transformer based on a voltage of each phase or a gap voltage of each phase generated in the three-phase transformer before and after closing the three-phase breaker;
 an input magnetic-flux-error calculation unit that obtains a closing-phase input magnetic-flux error for every phase based on the residual magnetic flux in each phase and in consideration of pre-arc characteristics and closing-time variation characteristics of the three-phase breaker;
 a closing-order determination unit that determines a closing order of phases of the three-phase breaker based on the residual magnetic flux in each phase;
 a target-closing-phase setting unit that calculates phases in which the input magnetic-flux error in each of a first closing phase and a second closing phase determined by the closing-order determination unit becomes a minimum value and sets the calculated phases as a target closing phase of the first closing phase and a target closing phase of the second closing phase, respectively, and that calculates a phase in which the input magnetic-flux error in the one remaining phase becomes a minimum value while assuming a predetermined phase in a predetermined reference phase as a reference point and sets the calculated phase as a target closing phase of a third closing phase;
 a target-closing-time setting unit that sets a time from the reference point to the target closing phase of the first closing phase as a target closing time of the first closing phase and a time from the reference point to the target closing phase of the second closing phase as a target closing time of the second closing phase, and that sets a time obtained by adding up a time from the reference point to the target closing phase of the third closing phase and a predetermined delay time as a target closing time of the third closing phase; and
 a closing control unit that generates a closing control signal and outputs the closing control signal to the three-phase breaker so as to close each phase at the target closing time of each phase set by the target-closing-time setting unit in response to a closing instruction to the three-phase breaker, wherein
 the predetermined delay time is set to exclude a period in which a magnetic flux between the first closing phase and the second closing phase possibly saturates because of the input magnetic-flux error in the first closing phase and the input magnetic-flux error in the second closing phase.

4. The inrush-current suppressing device according to claim 3, wherein the predetermined delay time is set to a time that is half a cycle of the three-phase alternating-current power or an odd multiple of a half cycle of the three-phase alternating-current power.

5. An inrush-current suppressing method applied to a configuration in which three-phase alternating-current power is supplied to and cut off from a three-phase transformer having a primary winding of a Y connection via a three-phase breaker, for suppressing an excitation inrush current that possibly occurs in the three-phase transformer during input of the three-phase breaker, the inrush-current suppressing method comprising:
   a first measuring step of measuring a voltage of each phase or a gap voltage of each phase generated in the three-phase transformer;
   a first calculating step of calculating a residual magnetic flux in each phase generated within the three-phase transformer based on a measuring result of the first measuring step before and after closing the three-phase breaker;
   a second calculating step of obtaining a closing-phase input magnetic-flux error for every phase based on the residual magnetic flux in each phase and in consideration of pre-arc characteristics and closing-time variation characteristics of the three-phase breaker;
   a first determining step of determining a closing order of phases of the three-phase breaker based on the residual magnetic flux in each phase;
   a second measuring step of measuring a voltage in a predetermined reference phase;
   a first setting step of calculating a phase in which the input magnetic-flux error in a first closing phase determined at the first determining step becomes a minimum value and setting the calculated phase as a target closing phase of the first closing phase;
   a second setting step of calculating a phase in which the input magnetic-flux error in the two remaining phases becomes a minimum value while assuming a predetermined phase in the reference phase measured at the second measuring step as a reference point, and setting the calculated phase as a target closing phase of a second closing phase;
   a third setting step of a setting time from the reference point to the target closing phase of the first closing phase as a target closing time of the first closing phase;
   a fourth setting step of setting a time difference between an arbitrary time in a period in which a magnetic flux in the first closing phase does not possibly saturate because of the input magnetic-flux error in the first closing phase and a time of the reference point as a delay time;
   a fifth setting step of a setting time obtained by adding up a time from the reference point to the target closing phase of the second closing phase and the delay time as a target closing time of the second closing phase; and
   a closing control step of generating a closing control signal and outputting the closing control signal to the three-phase breaker so as to close each phase at the target closing time of each phase set at the third setting step and the fifth setting step in response to a closing instruction to the three-phase breaker.

6. An inrush-current suppressing method applied to a configuration in which three-phase alternating-current power is supplied to and cut off from a three-phase transformer having a primary winding of a Δ connection via a three-phase breaker, for suppressing an excitation inrush current that possibly occurs in the three-phase transformer during input of the three-phase breaker, the inrush-current suppressing method comprising:
   a first measuring step of measuring a voltage of each phase or a gap voltage of each phase generated in the three-phase transformer;
   a first calculating step of calculating a residual magnetic flux in each phase generated within the three-phase transformer based on a measuring result of the first measuring step before and after closing the three-phase breaker;
   a second calculating step of obtaining a closing-phase input magnetic-flux error for every phase based on the residual magnetic flux in each phase and in consideration of pre-arc characteristics and closing-time variation characteristics of the three-phase breaker;
   a first determining step of determining a closing order of phases of the three-phase breaker based on the residual magnetic flux in each phase;
   a second measuring step of measuring a voltage in a predetermined reference phase;
   a first setting step of calculating phases in which the input magnetic-flux error in each of a first closing phase and a second closing phase determined at the first determining step becomes a minimum value, and setting the calculated phases as a target closing phase of the first closing phase and a target closing phase of the second closing phase, respectively;
   a second setting step of calculating a phase in which the input magnetic-flux error in the one remaining phase becomes a minimum value while assuming a predetermined phase in the reference phase measured at the second measuring step as a reference point, and setting the calculated phase as a target closing phase of a third closing phase;
   a third setting step of a setting time from the reference point to the target closing phase of the first closing phase as a target closing time of the first closing phase and a time from the reference point to the target closing phase of the second closing phase as a target closing time of the second closing phase;
   a fourth setting step of setting a time difference between an arbitrary time in a period in which a magnetic flux in the first closing phase and a magnetic flux in the second closing phase do not possibly saturate because of the input magnetic-flux error in the first closing phase and the input magnetic-flux error in the second closing phase and a time of the reference point as a delay time;
   a fifth setting step of setting a time obtained by adding up a time from the reference point to the target closing phase of the third closing phase and the delay time as a target closing time of the third closing phase; and
   a closing control step of generating a closing control signal and outputting the closing control signal to the three-phase breaker so as to close each phase at the target closing time of each phase set at the third setting step and the fifth setting step in response to a closing instruction to the three-phase breaker.

* * * * *